United States Patent [19]

Liddel, deceased et al.

[11] 3,912,856

[45] Oct. 14, 1975

[54] THREE-DIMENSIONAL IMAGE TRANSMITTING APPARATUS

[76] Inventors: William S. Liddel, deceased, late of Fullerton, Calif., by Orval Liddell, executor, P.O. Box 1533, Avalon, Calif. 90704

[22] Filed: Apr. 8, 1974

[21] Appl. No.: 459,051

Related U.S. Application Data

[63] Continuation-in-part of Ser. No. 238,103, March 27, 1972, abandoned.

[52] U.S. Cl. .................................... 178/6.5; 178/6.5

[51] Int. Cl.$^2$ .............................................. H04N 9/54

[58] Field of Search .......... 178/6.5, 18, 19; 250/199

[56] References Cited

UNITED STATES PATENTS

| | | | |
|---|---|---|---|
| 2,604,607 | 7/1952 | Howell | 178/6.5 |
| 2,961,486 | 11/1960 | Marks | 178/6.5 |
| 3,536,921 | 10/1970 | Caulfield | 178/6.5 |
| 3,585,382 | 6/1971 | Suganuma | 178/6.5 |
| 3,617,630 | 11/1971 | Reiffel | 178/18 |
| 3,636,250 | 1/1972 | Haeff | 178/6.5 |

*Primary Examiner*—Howard W. Britton
*Attorney, Agent, or Firm*—Fulwider, Patton, Rieber, Lee & Utecht

[57] ABSTRACT

Three-dimensional image transmitting apparatus including camera means having a scanner for scanning a subject with a scan beam. Signal generator means is provided which includes a generator screen disposed in the path of the scan beam as reflected from the subject and such generator means is responsive to impingement of the scan beam on the generator screen to generate an electrical location signal corresponding with the location of impingement on the signal generator screen by the scan beam. Image reconstruction means is provided which includes a variable depth reconstruction screen that is rendered locally luminous in response to impingement by a trace beam. A trace beam source is provided for directing a trace beam at the variable depth screen in a pattern determined by the location signal. Variable depth screen control means is responsive to positioning of the scanner to render the variable depth screen operative at depths corresponding to the position of such scanner.

19 Claims, 15 Drawing Figures

THREE-DIMENSIONAL IMAGE TRANSMITTING APPARATUS

CROSS-REFERENCE TO RELATED APPLICATION

This application is a continuation-in-part of application Ser. No. 238,103, filed Mar. 27, 1972, and now abandoned.

BACKGROUND OF THE INVENTION

1. Field of the Invention

The present invention relates to a device for obtaining information relating to the shape of a subject and transmitting such information to a remote location for reconstruction of a three-dimensional image of such subject.

2. Description of the Prior Art

Many efforts have been made to provide a feasible device for transmission of information relating to threedimensional subjects and subsequent reconstruction of a three-dimensional image corresponding with such subject. A device of this type is shown in U.S. Pat. No. 2,961, 486.

Most prior art devices of this type suffer the shortcoming that they are relatively elaborate in construction and, in many instances, the viewer of an image of a remote correspondent is distracted by the unnatural tendency of the reconstructed image to fail to maintain eye contact when such viewer alters his position or changes the position from which he is viewing the image.

SUMMARY OF THE INVENTION

The three-dimensional image transmitting apparatus of present invention is characterized by a scanning beam which scans a subject and reflects therefrom to impinge on a signal screen which generates an electrical location signal corresponding with the location of incidence of the scanner beam on such screen. Consequently, the contour of the subject scanned is formed on such screen and electrical signals corresponding with such contour may be transmitted to reconstruction device. The reconstruction device includes a variable depth screen means which is locally responsive to a trace beam at various depths to be rendered locally luminous. A trace beam is controlled by the location signal to trace the contour of the subject in the variable depth screen means while a control device controls the depth within such variable depth screen means at which the trace beam cooperates therewith to form a continuously moving luminous point for reconstructing a three-dimensional image.

The objects and advantages of the present invention will become apparent from a consideration of the following detailed description when taken in conjunction with the accompanying drawings.

DESCRIPTION OF THE PREFERRED EMBODIMENT

Figure 1:
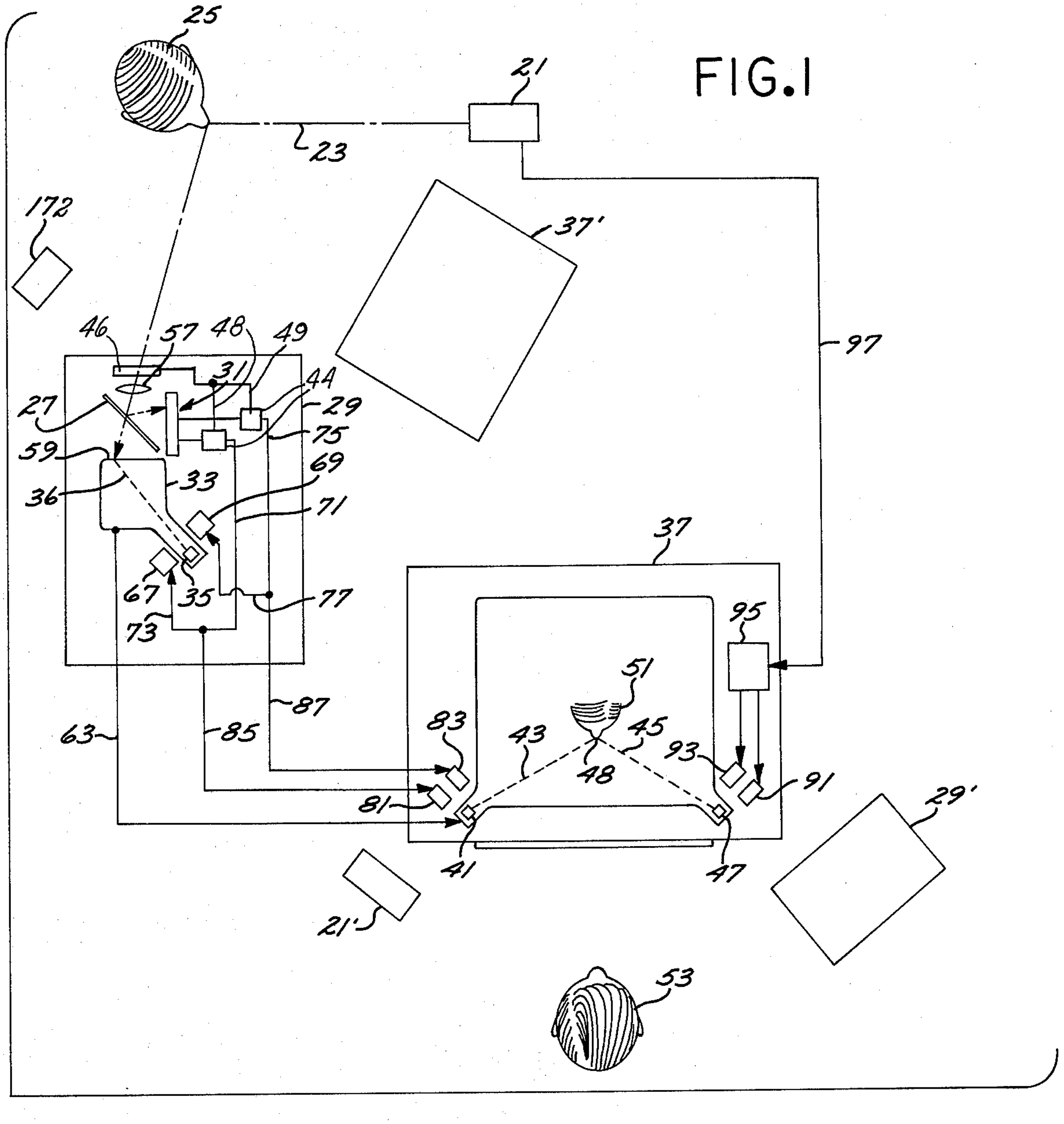
FIG. 1 is a schematic view of a three-dimensional image transmitting apparatus embodying the present invention.

The three-dimensional image transmitting apparatus of the present invention includes, generally, a scanner 21 which emits an invisible light beam 23 that reflects from a subject 25 to be directed onto a 45° combination window-mirror 27 included in a camera 29. The window-mirror 27 transmits visible light but reflects light of the wavelength of the invisible beam 23 to direct it onto a signal generator 31. Disposed behind the window-mirror 27 is a camera tube 33 which includes an electron beam gun 35 for emitting an electron intensity beam 36, such gun being controlled by the signal generator 31. The tube 33 is operative to generate an electrical signal corresponding with the intensity of an image impinged by the intensity beam 36. The camera is connected with a reconstruction tube 37 which includes an ion gun 47 for emitting a variable depth ion beam 45 which cooperates with an electron beam 43 emitted from an electron gun 41 to continuously form a luminous dot 48 at the intersection of such beams.

Thus, the scanner 21 progressively scans closely spaced planes on the subject 25 and the beam 23 is reflected from such planes to be focused on the window-mirror 27 to be reflected therefrom to define corresponding contours on the signal generator screen 31. Electrical location signals defining such contours are utilized to control the electron gun 35 of the camera tube 33 to cause such gun to precisely trace the contour that would be defined by the extension of the scan beam 23 to the front surface of the tube 33 to cause such electron beam to cooperate with the tube 33 to produce a continuously varying intensity signal corresponding with the local intensity of the image of the subject 25 appearing on the face of the tube 33. Also, the signals from the generator 31 control the electron gun 41 to direct the electron beam 43 at locations dictated by the signal generator 31. The ion gun 47 is connected with the scanner 21 and is moved in synchronism therewith. Consequently, the electron and ion beams 43 and 45 intersect and cooperate at continuously moving intersection points to form a continuously luminous point which moves through space to continuously define closely spaced contours which correspond with the contours traced by the scan beam 23 on the face of the subject 25. Consequently, a three-dimensional image 51 will be formed within the reconstruction tube 37, for viewing by a viewer 53.

The scanner 21 is vertically and horizontally deflectable and is controlled to continuously and progressively trace generally vertical planes in close horizontally spaced relationship on the face of the subject 25. In practice, the scanner 21 is disposed relatively close to the camera 29 to maintain the angle between the incoming and reflected beam 23 relatively small to minimize shadow areas on the subject 25.

Disposed intermediate the subject 25 and the camera tube 33 is a focusing lens 57 which focuses an image of such subject on the screen 59 of such tube.

The window-mirror screen 27 is of the type that transmits visible light but reflects the invisible scan beam 23. Consequently, an image of the subject is displayed on the screen 59 and the scan beam 23 is reflected from such screen 27 onto the signal generator screen 31.

As noted above, the tube 33 is of the nature that it is responsive to impingement of the electron beam 36 from the electron gun 35 upon the screen 59 to generate an intensity signal corresponding with the particular brightness of the portion of the screen impinged. An intensity signal lead 63 connects such camera tube 33 with the electron gun 41 of the reconstruction tube 37 to control the intensity of the electron beam emitted therefrom.

The signal generator 31 is connected with horizontal and vertical deflector control units 67 and 69 by means of leads 71, 73, 75 and 77. The horizontal and vertical deflector control units 67 and 69 control horizontal and vertical deflection of the electron beam 36 in direct relationship to the location of the signal screen 31 impinged by the reflected scan beam 23.

Such signal generator 31 is also connected with horizontal and vertical deflector control units 81 and 83 in the reconstruction tube 37 by means of leads 85 and 87 whereby the horizontal and vertical deflection of the electron beam 43 coordinates with horizontal and vertical deflection of the scan beam 23 as sensed by the electrical signal generator 31. The reconstruction tube may be constructed similar to that shown in FIG. 49 of U.S. Pat. No. 2,961,486. Connected with the leads 71 and 75 from the signal generator 31 are light intensity compensators 44 which are connected with an intensity sensor in the form of a photocell 46 by means of leads 48 and 49. The photocell 46 is mounted in front of the lens 57 and is transparent to the scan beam 23 but responsive to the intensity of light in the visible wavelength band to produce electrical signals proportionate to the light intensity. While such compensators 44 may be of any desired construction, those in the preferred embodiment include transistors having their triggering circuits connected with the respective leads 48 and 49 and incorporated in a network which produces a current level in the leads 71 and 75 which is inversely proportional to the intensity of the visual light impinging on the photocell 46. Consequently, the current level in the leads 71 and 75 will be dependent only on the location at which the scan beam 23 impinges on the window-mirror 27 and will be independent on light intensity.

Vertical and horizonal deflection of the ion gun 47 is controlled by a pair of control units 91 and 93 which are connected with a control signal generator 95. The signal control generator 95 is connected with the scanner 21 by means of a lead 97 to control deflection of the ion gun 47 to cause the ion beam 45 to exactly define the pattern defined by the scan beam 23.

In the embodiment shown in FIG. 1, a second camera 29′ is provided for recording information relating to an image of the viewer 53 as scanned by the scanner 21′. Also, a second reconstruction tube 37′ is provided for reconstruction of an image of the viewer 53.

Figure 4:
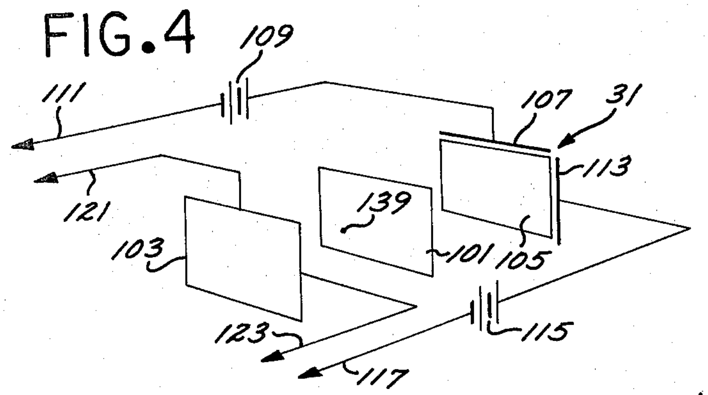
FIGS. 4, 5 and 6 are schematic views depicting a signal generator included in the three-dimensional image transmitting apparatus shown in FIG. 1.
Figure 5:
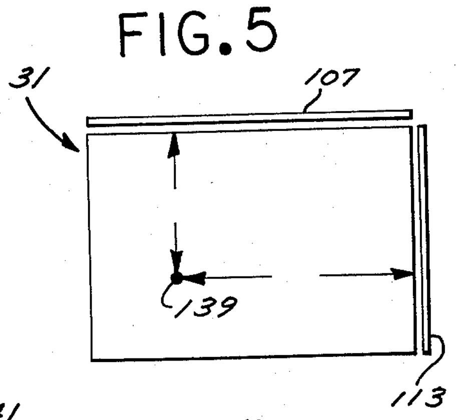

Referring to FIGS. 4 and 5, the signal generator 31 is in the form of a lamination consisting of a sheet 101 of a transparent photoconductive material sandwiched between a transparent conductor sheet 103 and an electrical resistive sheet 105. A vertical deflection strip 107 extends along the top edge of the resistive material 105 and has a voltage applied thereto by means of a voltage source 109 included in a vertical deflection lead 111. Similarly, a horizontal deflector conductor strip 113 extends along the right hand edge of the resistive sheet 105 and is connected with a voltage source 115 by means of a horizontal deflector lead 117. Also, connected with the top edge and right hand side of the conductor plate 103 are respective vertical and horizontal deflector leads 121 and 123. It will be appreciated that the vertical deflector leads 111 and 121 are shown as combined in the lead 75 shown in FIG. 1 and the horizontal deflector leads 117 and 123 are shown as being combined in lead 71.

Figure 2:
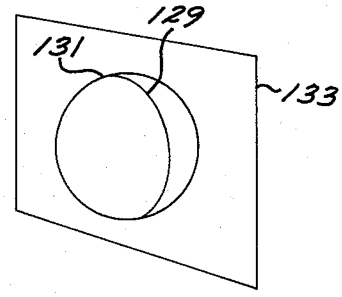
FIGS. 2 and 3 are schematic views depicting scanning by a scan beam included in the three-dimensional image transmitting apparatus shown in FIG. 1.
Figure 3:
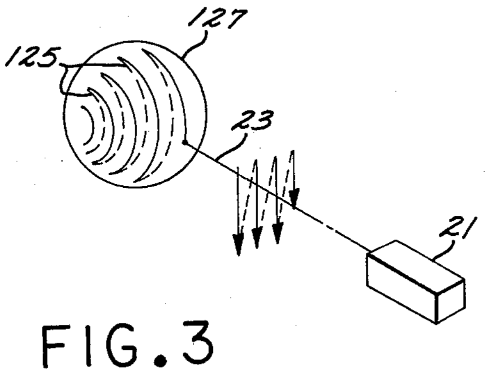

In operation the system is energized to cause the scanner 21 to commence scanning the subject 25 with the invisible scan beam 23. Such scanner 21 will scan the subject in a manner similar to that shown in FIG. 3 where such scanner is shown as progressively tracing vertical lines 125 across the face of a sphere 127. Each of these lines represents an intersection of the plane defined by one vertical sweep of the scan beam 23 with the surface of such sphere 127 similar to the circular line 129 defined on the sphere 131 by the plane 133 (FIG. 2).

It will be appreciated that the scan beam 23 disperses upon striking subject 25 to radiate generally from subject 25. On each scanning of such subject 25 portions of the reflected scan beam 23 will pass through the focusing lens 57 and strike the window-mirror 27 to be reflected therefrom and onto the signal generator screen 31. It will be appreciated that impingement on any area of the signal generator 31 by the scan beam 23 will render the photoconductive plate 101 locally electrically conductive, as for example at the point 139, to permit current flow through such point from the conductor plate 103 to the resistive plate 105.

Since the photocell intensity sensor 46 senses the intensity of ambient light and generates an electrical signal which controls the current flow through the compensator networks 44 in inverse proportion to such intensity, any variations in ambient light are totally compensated for, thus rendering the reflection signals in the leads 71 and 75 dependent only to the location of impingement of the scan beam 23 on the signal generator 31 as dictated by reflection from the window-mirror 27. Thus, it will be appreciated that the amount of current flow to either one of the vertical or horizontal deflection strips 107 and 113 will be inversely proportional to the distance which the conductive point 139 is spaced from the respective strip only. Consequently, the resultant current flow in the leads 71 and 75 is conducted through the respective leads 73 and 77 to the respective horizontal and vertical deflector units 67 and 69 to deflect the electron gun 35 to direct the electron beam 36 at a point on the tube screen 59 in alignment with a continuation of the reflected scan beam 23 to generate a signal corresponding with the brightness of the portion of the image appearing at that point on such screen (i.e., a signal corresponding to the brightness of the area of the subject 25 impinged by the scan beam 23). The intensity signal so generated is conducted through the intensity lead 63 to the reconstruction electron gun 41 to control the intensity of the electron beam emitted therefrom.

Concurrently, the location signals are communicated from the respective leads 71 and 75 through the leads 85 and 87 to the respective reconstruction tube horizontal and vertical deflector units 81 and 83 to control directioning of the reconstruction electron beam from the electron gun 41. Concurrently, synchronized pulses are communicated from the continuously and uniformly scanning scanner 21, through the lead 97 to the location control generator 95 to cause such generator to control the deflector units 91 and 93 to direct the ion beam 45 in a pattern duplicating the uniform and continuous pattern of the scanner beam 23 to, in effect, for a variable depth screen. The ion beam 45 is directed at an angle to locate the intersection point with the electron beam 43 at a depth within the reconstruction tube corresponding with the depth at which the scan beam 23 contacted the subject 25. Similarly, signals from the generator 95 cause the horizontal and vertical deflector control units 91 and 93 direct the electron beam 43 at an angle to cause it to intercept the ion beam 45 at a point corresponding with the point at which the scan beam 23 struck the subject 25. It will be appreciated that rapid scanning by the scan beam 23 causes the electron and ion beams 43 and 45 to rapidly generate continuously moving luminous points which trace a contour corresponding with the contour of the subject 25 to thereby define a three-dimensional outline observable by the viewer 53 so such viewer will gain the impression of viewing a three-dimensional figure.

It will be appreciated that if the subject 25 shifts or alters the orientation of his head the image 51 will be correspondingly shifted, thereby causing the viewer 53 to respond by rotating his head to follow such movement. Thus, the image of the viewer 53 photographed by the camera 29' and reconstructed in the reconstruction tube 37' will be likewise shifted to give the subject 25 the impression that the image of the viewer 53 is tending to maintain eye contact, thus giving the impression of viewing the actual subject.

Figures 6, 7:
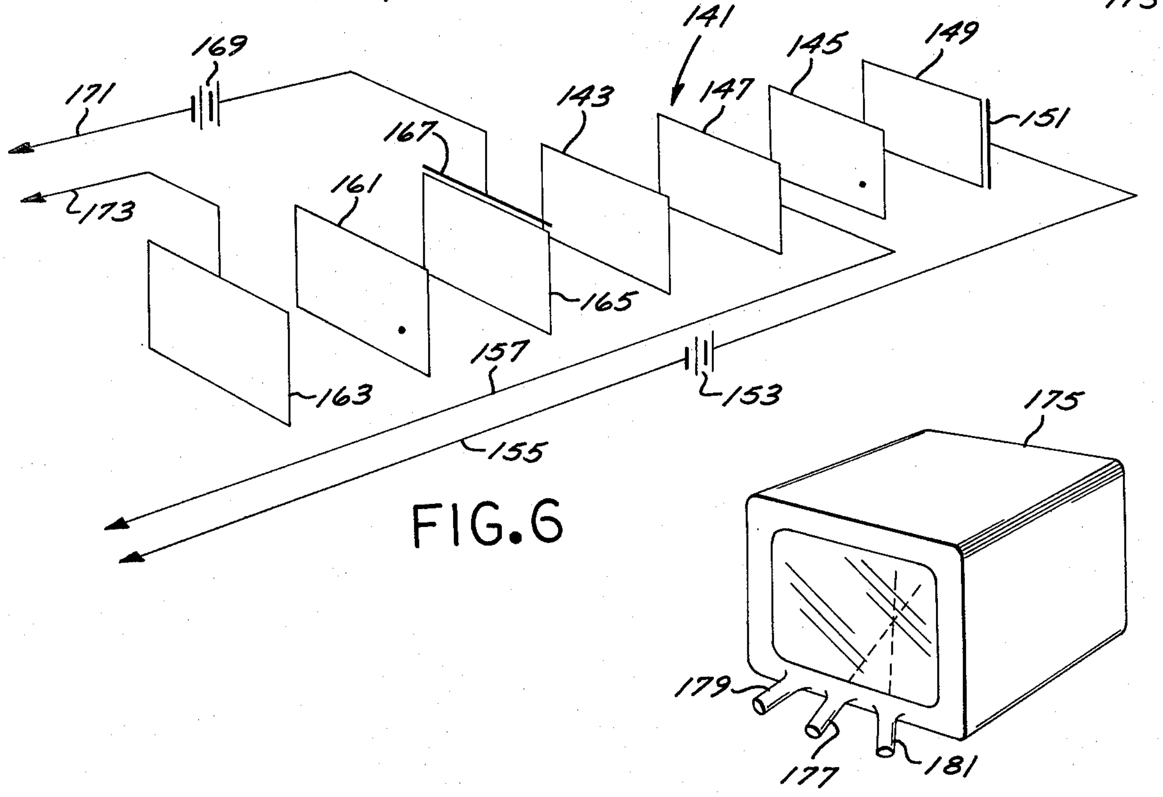
FIG. 7 is a perspective view of a reconstruction cabinet which may be utilized with the three-dimensional image transmitting apparatus shown in FIG. 1.

The signal generator, generally designated 141, shown in FIG. 6 is substantially the same as that shown in FIGS. 4 and 5, except that separate horizontal and vertical deflection control units are formed on opposite sides of an electrical insulator sheet 143.

The horizontal deflection unit includes a photoconductive plate 145 sandwiched between an electrically conductive plate 146 and a resistive plate 148. A horizontal deflection conductor strip 151 extends along the right hand side of resistor plate 149 and is connected with a power source 153 by means of a horizontal deflector lead 155. Connected with the right hand end of the conductor plate 147 is a horizontal deflector lead 157 for cooperating with the lead 155 to conduct a signal corresponding with the point of impingement on the photoconductor plate 145 by the scanner beam 23.

Similarly, the vertical deflection unit includes a photoconductor plate 161 sandwiched between a conductor plate 163 and a resistive plate 165. Extending along the top edge of the resistive plate is conductive strip 167 which is connected with a power source 169 by means of a vertical deflector lead 171. Also, connected to the top edge of the conductor plate 163 is a vertical deflector lead 173 which cooperates with the deflector lead 171 to provide a signal corresponding with the vertical position of the point of impingement on the photoconductor plate 161 by the scan beam 23.

Referring to FIGS. 1 and 7, in order to reduce the possibility of shadows being formed in the area of the image 51, a second scanner 172 (FIG. 1) may be provided for scanning the subject 25 from a different angle. For such an arrangement, a reconstruction tube 175 (FIG. 7) is provided which includes a central electron gun 177 having ion guns 179 and 181 disposed on opposite sides thereof and connected with the respective scanners 21 and 172 to cooperate with the electron gun 177 to form an image corresponding to the image 51. In such an arrangement, the operation would be substantially the same as for the apparatus shown in FIG. 1 except that the scanners 21 and 172 may operate intermittently and alternately in rapid succession to actuate the electron guns 179 and 181 intermittently and alternately for cooperation with the electron gun 177 to form a shadow-free image.

Figure 8:
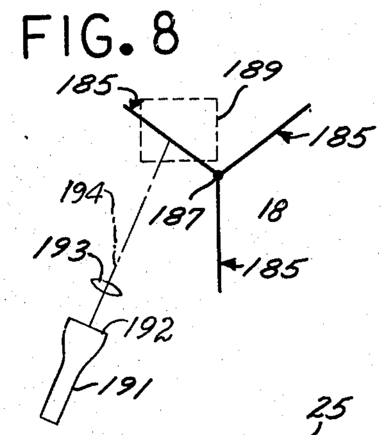
FIGS. 8 and 9 are schematic views of two different embodiments of variable depth image screens which may be utilized with the three-dimensional image transmitting apparatus shown in FIG. 1.

The reconstruction device shown in FIG. 8 is similar to that disclosed in FIG. 1 except that the flying dot at the intersection point is generated optically rather than electrically. Such device includes a plurality of rotatable dipolar screens 185 which are substituted for the ion gun 47 (FIG. 1) and are carried from a central axis 187 for rotation through an image zone 169 at a fixed speed corresponding with the sweep of the ion gun 47.

Figure 14:
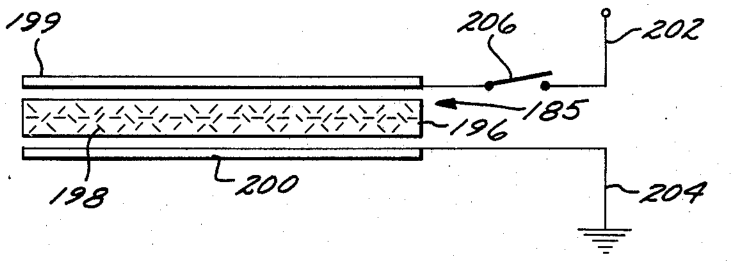
FIG. 14 is a diagrammatic view of a dipolar suspension play incorporated in the screens 185 shown in FIG. 8.

The dipolar screens 185 are of generally transparent sandwich construction similar to that shown in U.S. Pat. No. 3,512,869 and each include a dipolar suspension sheet 196 (FIG. 14) which suspends an array of opaque needle-like particles 198 therein in random fashion to normally block the projection therethrough of light. The suspension sheet 196 is sandwiched between a pair of respective positive and negative transparent electrically conductive plates 199 and 200, such plates being connected between an electrical source and ground by means of respective leads 202 and 204, the lead 204 including a commutator switch 206.

A high intensity projection tube 191 is substituted for the electron gun 41 and has a received image displayed on the face 192 thereof. The projection tube 191 includes a high intensity beam 194 controlled by the horizontal and vertical deflector control units 81 and 83 (FIG. 1) to be projected through a lens system 193 to be focused on the screens 815 as such screens 185 are rotated.

In operation, the dipolar sheets are rotated at a speed corresponding with the sweep of the scan gun 21 (FIG. 1), it being appreciated that the speed or rotation thereof is synchronized with the horizontal sweep of such gun 21. The image of the object 25 is displayed on the screen 192 of the high intensity projection tube 191 and the high intensity beam 194 projected therefrom in a trace pattern dictated by the horizontal and vertical deflection units 81 and 83 (FIG. 1) to thus pick up the image content and impinge on a sheet 185 which has been selectively de-energized. It will be appreciated that the dipolar sheet control switches 206 are normally closed, thus applying an electrical field across the associated suspension sheets 196 to align the opaque particles 198 perpendicular to the plane of such suspension sheet to render such respective sheets transparent for unhindered projection therethrough of the projection beam 194. However, as the sheets 185 are rotated through the image display zone 189, the respective switches 206 are opened at a moment dictated by synchronization with the scan gun 21 (FIG. 1) to thus remove the electrical field from the suspension sheet 196 to permit the particles 198 to assume their random orientation, thus giving the sheet a relatively white appearance to cause optical interference with the image content-carrying light beam 194 for illumination of a point on the de-energized screen 185 corresponding with the intersection point 48 shown in FIG. 1. It will be noted that as the light beam 194 scans the image displayed on the screen 192, it picks up the intensity information therefrom for the particular localized area of such image to develop a corresponding intensity dot at the intersection between such beam and the de-energized dipolar screen 185.

Figure 9:
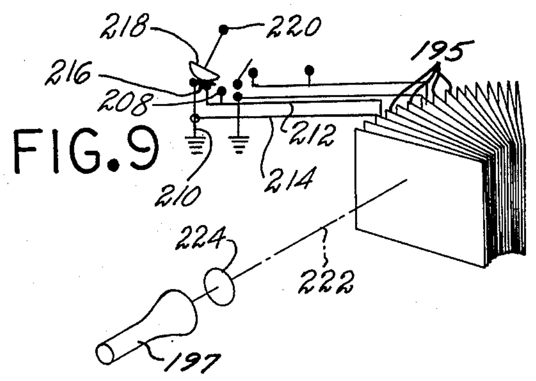

The reconstruction device shown in FIG. 9 is substantially the same as the one shown in FIG. 8 except that it includes a book of dipolar screens 195 disposed in close spaced relationship in an image zone for having an image from the projector tube 197 being displayed therein.

The dipolar screens 195 are similar to the screens 185 except that they are relatively closely spaced and are arranged to radiate outwardly from a central point in fan fashion. The electrically conductive transparent sheets disposed on opposite sides of each screen 195 are connected between a power supply lead 208 and ground 210 by means of respective leads 212 and 214. A spring switch 216 is arranged for connecting between the leads 212 and 214 and is controlled by a rotary shoe 218 which rotates about a pivot point 220 at a speed synchronized with the horizontal trace speed of the scan gun 21 during its scanning of the subject 25 (FIG. 1). It will be noted that while each of the dipolar screens 195 have similar control circuitry, only the circuitry associated with two such screens is shown in FIG. 9. The high intensity projection tube 197 is similar to the tube 191 and includes a projection gun for projecting a high intensity light beam 222 similar to the light beam 194.

In operation, the rotary shoe 218 is connected with a drive motor (not shown) which drives such shoe at a speed of rotation synchronized with the scan gun 21 (FIG. 1) to progressively ground the positive leads 212 of each sheet 195 to cause such screens to be progressively de-energized and rendered opaque, thus giving the impression of a white screen rotating smoothly through the entire book of screens 185 throughout the image display area. It will be appreciated that the screens 195 are arranged to cumulatively form a segment of a circle and that the switches 216 are disposed about an entire circle to cause the white screen formed by progressive de-energization of such screens to repeatedly move from the screen at one end of the book of screens to the screen at the opposite end of such book of screens. Concurrent with the sweeping of such white screen through the book of screens 195, the image content-carrying light beam 122 is projected from the projection tube 197 in a pattern dictated by the horizontal and vertical deflector control units 81 and 83 (FIG. 1) to pick up the local intensity of the image displayed on the face of such tube and be projected through the lens 224 to be focused on the dipolar screen 195 de-energized at that particular moment in time. While only a mechanical arrangement for de-energizing the dipolar screens 185 or 195 has been described hereinabove, it will be readily apparent that various circuitries employing solid state components may be adopted to accomplish this same function.

Figure 10:
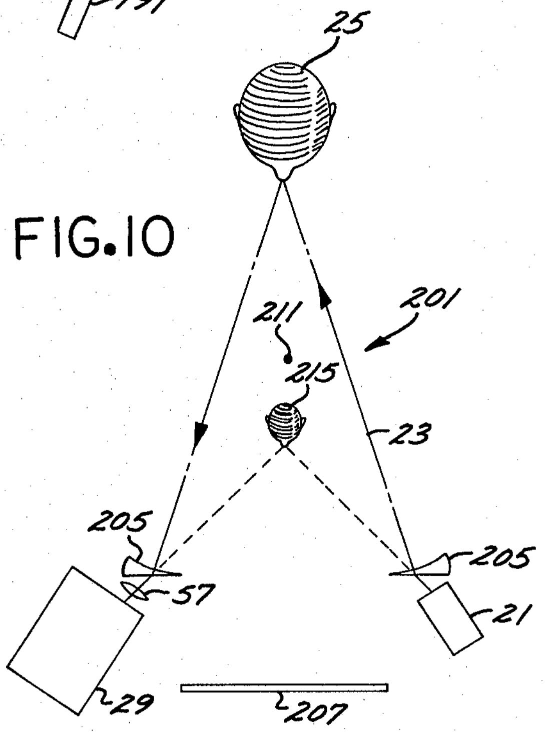
FIG. 10 is a schematic view of a three-dimensional camera included in the three-dimensional image transmitting apparatus shown in FIG. 1.
Figure 11:
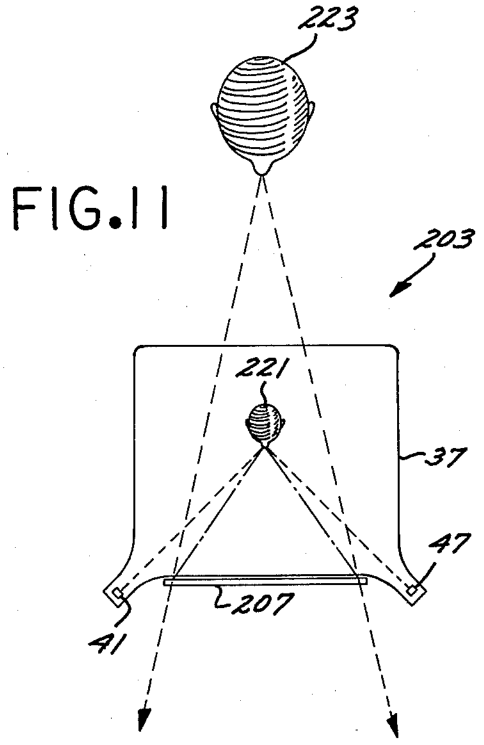
FIG. 11 is a schematic view of a reconstruction tube included in the threedimensional image transmitting apparatus shown in FIG. 1.

Referring to FIGS. 10 and 11, the camera and reconstruction devices 201 and 203, respectively, shown therein are similar to that shown in FIG. 1 except that the camera device includes edge sections 205 of a negative lens and the reconstruction devices 203 include a complementary positive lens 207. A positive lens 207 is also shown in position in front of the camera 201 shown in FIG. 10.

The scan light 21 is aimed generally toward the principal focal point 211 of the lens 205 and the scan beam 23 is bent by such lens 205 to be directed at the subject 25 and the scanner 21 is controlled to sweep the virtual image 215 causing the bent beam 23 to sweep the subject 25. The beam 23 reflected from the subject 25 passes through the negative lens section 205 to be bent and is directed through the lens 57 to the camera 29 thereby resulting in the beam sweeping the signal generator screen 31 (FIG. 1) as if it had been reflected from the virtual image 215. Consequently, the mechanics of this arrangement result in information being registered on the signal generator screen 31 as if a compressed subject, similar to the virtual image 215, had been scanned.

The positive lens 207 in the reconstruction tube 37 of FIG. 11 is a complement of the negative lens 205 (lenses 205 and 207 normally having the same focal length) and, consequently, the image 221 reproduced by the ion and the electron guns 41 and 47, respectively, is viewed by the viewer as if the virtual image 223 had been reconstructed. Consequently, the lenses 205 and 207 enable the virtual image 221 to be formed in a relatively small reconstruction tube 37 while providing magnification in size.

Figure 12:
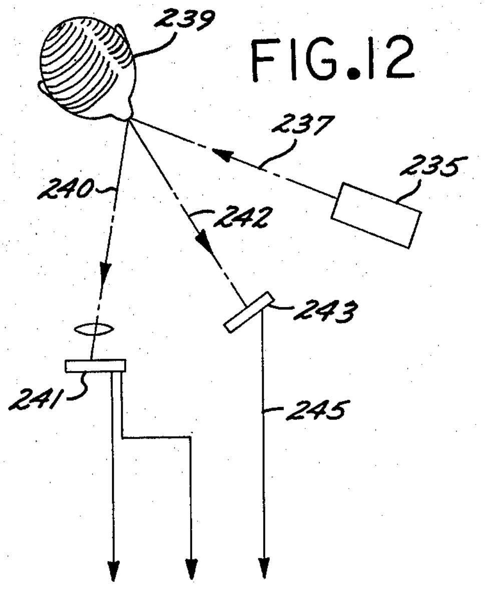
FIG. 12 is a second embodiment of the three-dimensional image transmitting apparatus of present invention.

The image transmitting apparatus shown in FIG. 12 is similar to that shown in FIG. 1 except that it is intended for use in a non-illuminated room and the scan light 235 emits a beam of visible light 237 which is reflected from the subject 239 along reflected paths 240 and 242 to both a location signal generator 241 and a photocell 242, respectively. The location signal generator 241 is similar to the signal generator 31 shown in FIG. 1 and generates signals corresponding with the horizontal and vertical positioning of the beam 240 striking the surface thereof. The photocell 243 is responsive to the intensity of the beam 242 reflected from the subject 239 to generate an intensity signal corresponding therewith for conduction through an intensity signal lead 245. Thus, the camera system shown in FIG. 12 may be utilized with the reconstruction system shown in reconstruction tube 37 shown in FIG. 1 without necessity of the camera tube 33.

Figure 13:
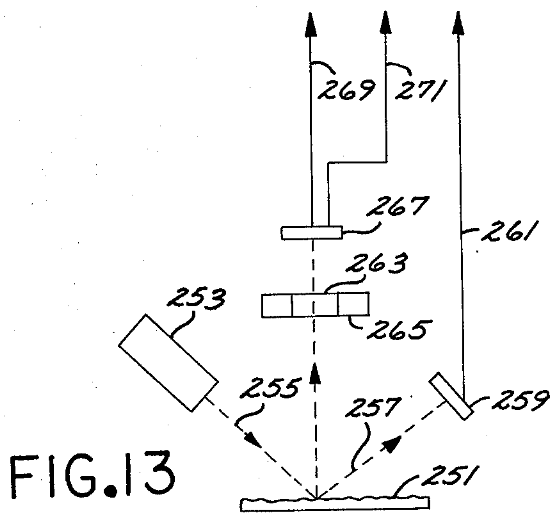
FIG. 13 is a third embodiment of the three-dimensional image transmitting apparatus of present invention.

The image transmitting apparatus shown in FIG. 13 is also similar to that shown in FIG. 1 except that it is intended for transmitting images of microscopic subjects 251 similar to that referred to on Page 55 of the January 1972 issue of *Scientific American*. Such apparatus includes an electron scanner 253 for emitting a beam of electrons 255 onto the surface of the subject 251. The electron beam 255 is reflected from the surface of the subject 251 to form a first beam 257 which strikes the surface of an electronsensitive intensity modulator 259 that is responsive to the intensity of electrons striking the surface thereof to produce an intensity-modulated signal for conduction along a lead 261 to a reconstruction tube similar to the tube 37 shown in FIG. 1.

A second electron beam 263 is reflected from the surface of the subject 251 to be directed through the field of an electron lens 265 to be focused on the surface of an electron-sensitive scan signal generator 267 which is responsive to the location of impingement thereon to generate vertical and horizontal deflection signals for conduction through respective leads 269 and 271.

The electron-sensitive scan signal generator 267 includes an electrically resistive sheet having the respective vertical and horizontal deflection signal leads 269 and 271 connected to the vertical and horizontal edges thereof whereby electrons impinging at a particular location on such generator will flow to the leads 269 and 271 at a rate dictated by the distance the location of impingement is spaced from the respective vertical and horizontal edge of such sheet.

Figure 15:
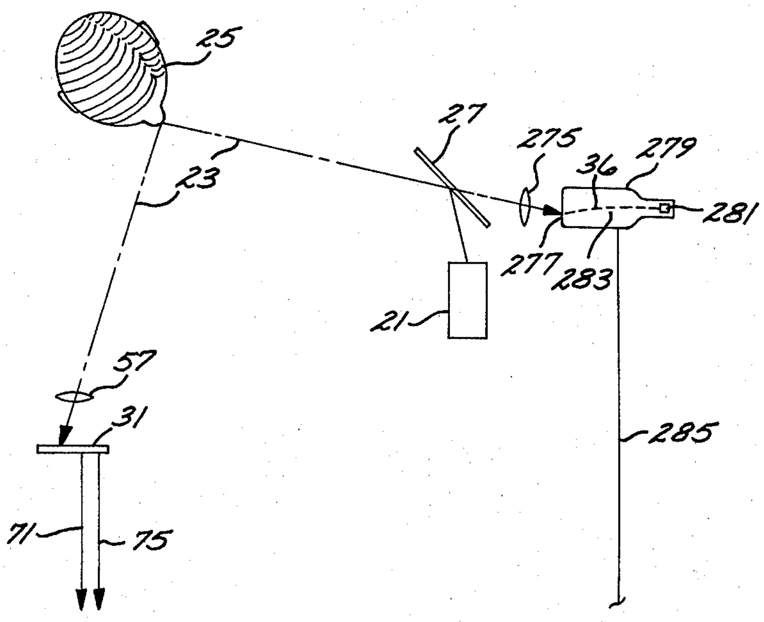
FIG. 15 is a diagrammatic view of a fourth embodiment of the three-dimensional image transmitting apparatus of the present invention.

The camera disclosed in FIG. 15 is similar to that shown in FIG. 1 except that it is readily adaptable for use with a conventional two-dimensional television set. The signal generator 31 is identical to that disclosed in FIG. 1 and includes deflection signal leads 71 and 75 leading therefrom. The scan gun 21 is provided for directing a scan beam 23 onto the window-mirror 27 in a generally horizontally traveling roster pattern for reflection therefrom to reflect from the object 25 and through the focusing lens 57 to be focused on the signal generator 31. Visible light from the object 25 is transmitted through the window-mirror 27 to project through a lens 275 to be focused on the face 277 of a camera tube 279 similar to the tube 33 (FIG. 1). A scan gun 281 scans the face 277 of such tube with an electron beam 283 in a standard horizontally oscillating T.V. roster pattern corresponding with the pattern of the scanner 21 whereby the beam 23 as projected through the window-mirror 27 and lens 275 will exactly follow the pattern of the beam 283 as it moves across the face 277 of the tube 279. As in the case of the tube 33, an intensity level signal lead 285 leads from such tube for connection with the T.V. set 37 to control the intensity of the intersecting electron and ion beams 43 and 45.

Consequently, in three-dimensional operation the scanner gun 21 scans the mirror-window 27 in a conventional horizontally oscillating T.V. roster pattern to be reflected therefrom and onto the object 25 for reflection through the focusing lens 57 and onto the deflection signal generator 31 to develop the deflection control signals. Concurrently, the electron beam 283 sweeps repeatedly across the image displayed on the face 277 of the tube 279 in a roster pattern to develop the intensity signals for transmission through the intensity lead 285. The developed signals are utilized to control the electron and ion guns 41 and 47 in the reconstruction tube 37 (FIG. 1).

When the camera shown in FIG. 15 is to be utilized with a conventional two-dimensional television, only the intensity signals transmitted through the lead 285 are needed to scan a television picture tube for conventional display of a two-dimensional picture.

From the foregoing, it will be apparent that the three-dimensional image transmitting apparatus of the present invention provides an economical and highly effective means for transmitting information relating to the appearance of a subject and for reconstruction of an image of such subject. Only a minimal amount of information need be transmitted and the reconstructed image is convincingly lifelike.

Various modifications and changes may be made with regard to the foregoing detailed description without departing from the spirit of the invention.

I claim:

1. Three-dimensional image transmitting apparatus comprising:

camera means including first scan beam means for projecting a scan beam in a predetermined direction toward a subject and operable to oscillate said beam to progressively scan the surface of said subject for reflection therefrom in a second direction to trace patterns corresponding with the contours of said object scanned during each pass of said scan beam across the surface of said subject;

signal generator means including signal generator screen means disposed in the path of said scan beam as reflected from said subject and responsive to localized impingement by said scan beam to generate a first electrical location signal corresponding with the location of the point of impingement thereon by said scan beam;

image construction means including variable depth screen means operative in response to impingement by a trace beam to be rendered locally luminous at variable depths in response to impingement by a trace beam;

a first trace beam means for directing said trace beam at said variable depth screen means;

variable depth screen control means for controlling the operative depth of said variable depth screen means in coordination with the pattern traced by said beam means; and trace beam control means coupled with said signal generator means and said trace beam means and responsive to said electrical location signal to move said trace beam in patterns dictated by said signal generator means to trace an image in said variable depth screen means corresponding with the contour of said subject.

2. Three-dimensional image transmitting apparatus as set forth in claim 1 wherein:

said scan beam means includes second scan beam means spaced from said first scan beam means for projecting a second scan beam at said subject from a different direction and operable to oscillate said second scan beam means to scan said subject to be reflected therefrom to trace patterns on said signal generator screen means corresponding with the contours of said subject traced;

said signal generator means is responsive to said scan beams to generate a second electrical signal; and second trace beam means spaced from said first trace beam means, connected with said signal generator, and responsive to said second electrical signal to trace patterns in said variable depth screen means corresponding with the contour of said subject traced during each scan, said first and second trace beam means being alternately operable to trace said patterns.

3. Three-dimensional image transmitting apparatus as set forth in claim 1 wherein:
said scan beam means includes means operative to produce said scan beam as it scans said subject with a light beam;
said apparatus includes photocell means disposed in the path of said scan beam as reflected from said subject and responsive to the intensity of the reflected beam to generate an intensity signal corresponding with said beam; and
said image construction means includes means connected with said photocell means and responsive to said intensity signal to vary the luminosity of the operative intersection point of said variable depth screen and said trace beam.

4. Three-dimensional image transmitting apparatus as set forth in claim 1 wherein:
said scan beam means includes means operative to produce an electromagnetic beam for scanning said subject; and
said signal generator means includes means responsive to said electromagnetic scan beam as reflected from said subject to generate said first electrical location signal.

5. Three-dimensional image transmitting apparatus as set forth in claim 1 wherein:
said camera means includes a camera tube including an image-receiving camera facing said subject and intensity beam means for scanning an image of said subject displayed on said image-receiving screen with an intensity beam in synchronization with said scan beam scanning said subject, said camera means further including image intensity sensing means responsive to the local intensity of the image scanned by said intensity beam to generate an image intensity signal of a magnitude corresponding with said image intensity; and
said image construction means including image intensity control means connected with said image intensity sensing means and responsive to the magnitude of said image intensity electrical signal to correspondingly vary the luminosity of the intersection point of said variable depth screen and said trace beam.

6. Three-dimensional image transmitting apparatus as set forth in claim 1 wherein:
said signal generating means includes a photoconductive sheet sandwiched between first and second electrically conductive sheets.

7. Three-dimensional image transmitting apparatus as set forth in claim 1 wherein:
said variable depth screen means includes screen beam means for projecting a movable screen beam which is operative upon interaction with said trace beam to be rendered luminous and screen beam control means connected with said scan beam means for synchronizing movement of said screen beams with said trace beam.

8. Three-dimensional image transmitting apparatus as set forth in claim 1 wherein:
said variable depth screen means includes a plurality of planar screens spaced one behind the other.

9. Three-dimensional image transmitting apparatus as set forth in claim 1 wherein:
said variable depth screen means includes a planar screen and means for moving said planar screen in synchronism with said scanning beam.

10. Three-dimensional image transmitting apparatus as set forth in claim 1 wherein:
said camera includes an image intensity detection tube for receiving an image of said subject and intensity detection means for scanning said tube to produce an electrical signal corresponding with the local intensity of said image; and
said construction means includes means connected with said intensity modulation means and responsive to said intensity electrical signal to vary the luminosity of the intersection point between said trace beam and variable depth screen means.

11. Three-dimensional image transmitting apparatus as set forth in claim 1 wherein:
said camera includes tube means for receiving an image of said subject and responsive to impingement of an intensity detector beam on said image to produce an intensity electrical signal corresponding with the intensity of said image;
intensity detector beam means for scanning said image on said tube with an intensity detector beam; and
said construction means includes intensity control means coupled with said tube means and responsive to said intensity electrical signal to correspondingly vary the luminosity of the intersection point between said variable depth screen means and said trace beam.

12. Three-dimensional image transmitting apparatus as set forth in claim 1 wherein:
said camera includes first and second negative lens means having a selected focal length and disposed in the respective paths of said scan beams and reflected scan beam to deflect said beams a similar amount; and
said construction means include positive lens means having a focal length to complement said selected focal length to complement the focal lengths of said first and second lens means and disposed adjacent said variable depth screen means for viewing therethrough by a viewer.

13. Three-dimensional image transmitting apparatus as set forth in claim 12 that includes:
a focusing lens interposed between said subject and said tube screen means for focusing said reflected scan beam on said tube screen means.

14. Three-dimensional image transmitting apparatus as set forth in claim 1 wherein:
said scan beam means includes means for producing an electron beam for scanning said subject; and
said signal generator means includes means operative in response to impingement thereon of said electron beam as reflected from said subject to generate said electrical location signal.

15. Three-dimensional image transmitting apparatus as set forth in claim 14 that includes:
electron lens means disposed in the path of said electron beam as reflected from said subject to focus said beam on said signal generator means.

16. Three-dimensional image transmitting apparatus as set forth in claim 14 that includes:

an electron sensitive intensity modulator disposed in the path of said electron beam as reflected from said subject and operative in response to the intensity of electrons striking thereon to produce an intensity modulated signal; and intensity control means connected with said trace beam means and with said electron sensitive intensity modulator and operative in response to said intensity modulated signal to correspondingly vary the intensity of said trace beam.

17. Three-dimensional image transmitting apparatus as set forth in claim 1 wherein:

said scan beam means includes means for producing a beam of invisible light defining said beam; and said signal generator means includes means responsive to the scan beam reflected from said subject to generate said electrical location signal.

18. Three-dimensional image transmitting apparatus as set forth in claim 17 wherein:

said signal generator means includes camera tube means formed with said signal generator and screen means locally responsive to the intensity of the image of said subject projected thereon and to local impingement by an electron beam to produce an electrical intensity signal corresponding with the local intensity of the image of said object displayed thereon, said tube including electron gun means for directing an electron beam at said screen and gun control means for directing said electron beam in repeated scan paths across said tube screen means in a pattern corresponding with the pattern of said reflected scan beam as it strikes said signal generator screen means; and said image construction means includes intensity control means responsive to variations in said electrical intensity signal to correspondingly vary the local intensity of said image.

19. Three-dimensional image transmitting apparatus as set forth in claim 18 that includes:

window-mirror means interposed between said subject and said tube screen means for transmitting visible light to said tube screen means and for reflecting said reflected scan beam and a signal generating panel disposed in the path of said scan beam as reflected from said window-mirror means and responsive to the location of impingement thereon of said reflected scan beam to produce said electrical location signals.

* * * * *